United States Patent [19]

Vilbeuf

[11] 4,148,518
[45] Apr. 10, 1979

[54] SPRUNG SEAT FOR ALL VEHICLES
[75] Inventor: Jean Vilbeuf, Paris, France
[73] Assignee: Societe Sifra, Gien, France
[21] Appl. No.: 790,137
[22] Filed: Apr. 22, 1977
[30] Foreign Application Priority Data
 Dec. 8, 1976 [FR] France ............... 76 36957
[51] Int. Cl.² ........................................... F16M 11/00
[52] U.S. Cl. .................. 296/65 R; 137/599; 248/588; 248/631
[58] Field of Search ............. 296/65 R; 248/399, 400; 137/629, 599, 512.1

[56]  References Cited
  U.S. PATENT DOCUMENTS

| 3,300,203 | 1/1967 | Carter et al. | 248/400 UX |
| 3,752,432 | 8/1973 | Lowe | 248/400 |
| 3,879,007 | 4/1975 | Barton et al. | 248/400 |

Primary Examiner—David M. Mitchell
Assistant Examiner—Gene A. Church
Attorney, Agent, or Firm—Michael J. Striker

[57] ABSTRACT

This sprung seat notably for off-the-road vehicles is mounted on a base frame and provided with elastic return means in the form of a hydropneumatic device associated with an automatic monitoring distributor adapted to be connected to the pressure fluid circuit of the vehicle and capable of regulating the fluid pressure in the hydropneumatic device as a function of the seat squab frame oscillation. The hydropneumatic device is constructed to eliminate any mechanical frictional contact and incorporates adjustable valve means adapted to be set as a function of the weight of the occupant of the seat.

18 Claims, 10 Drawing Figures

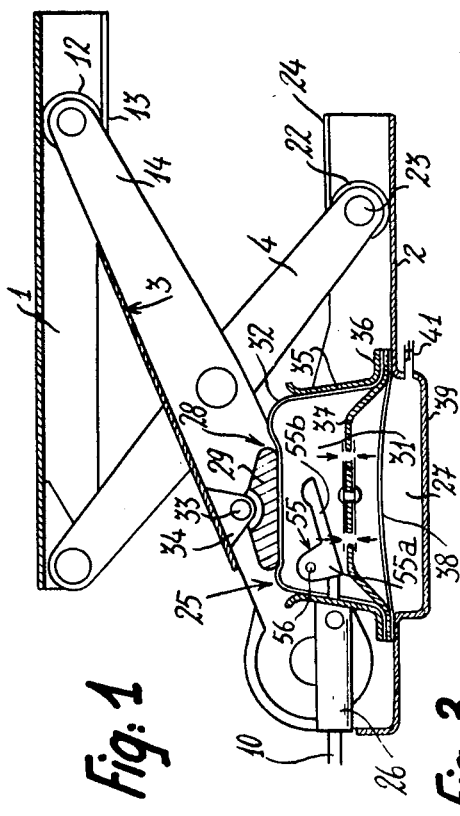
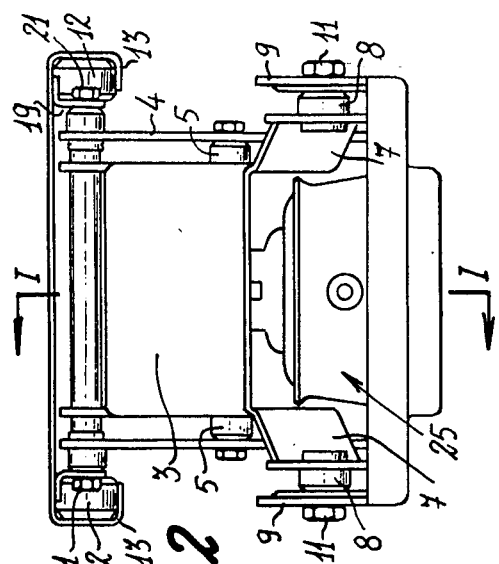
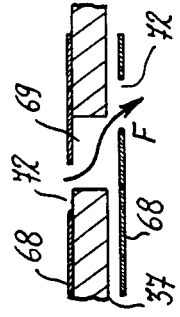
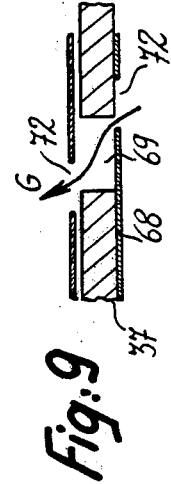
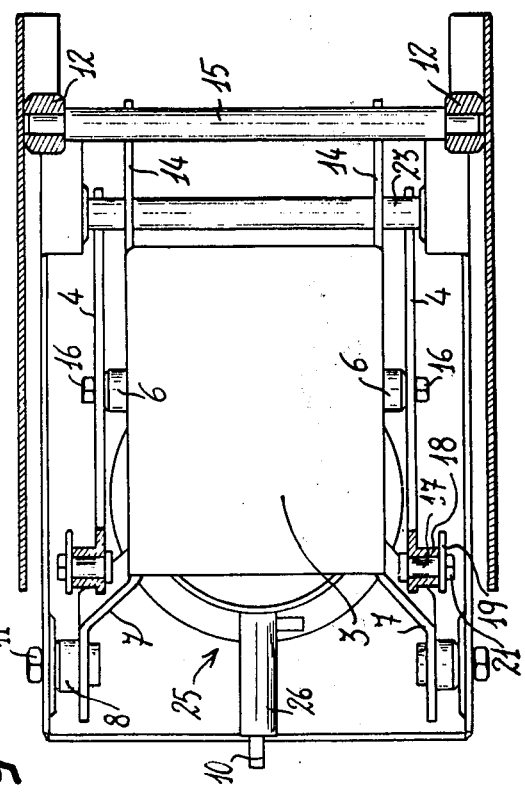

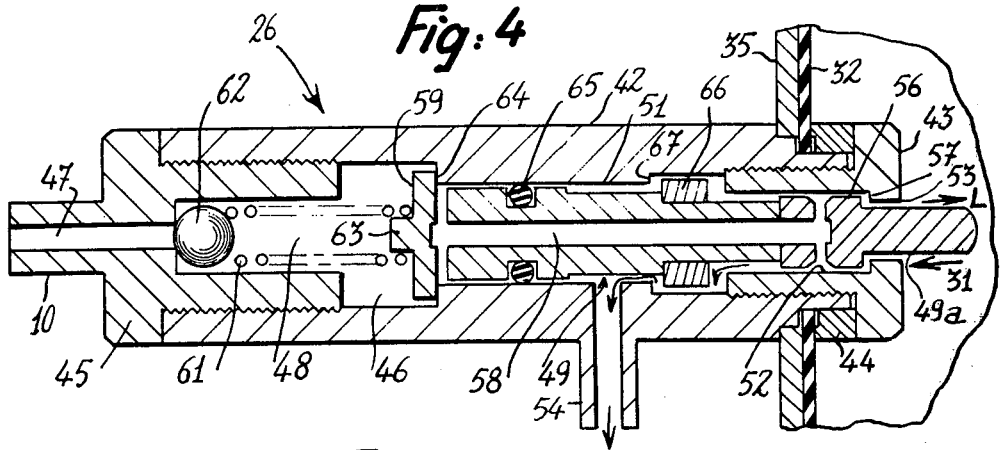
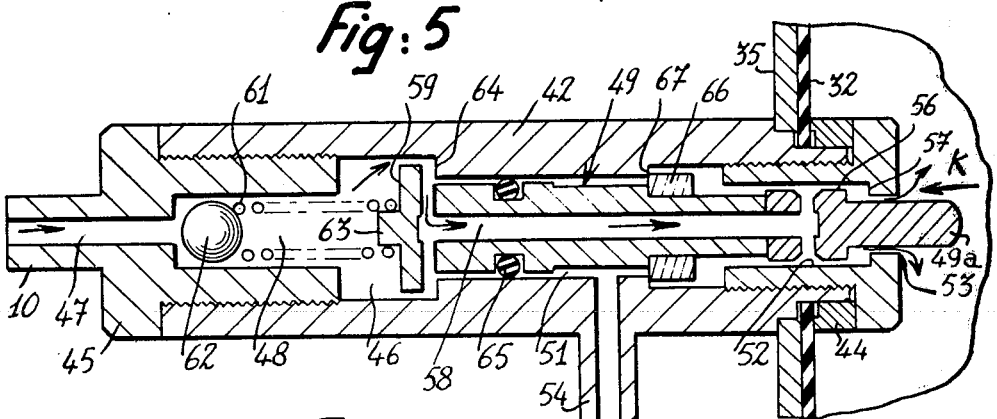
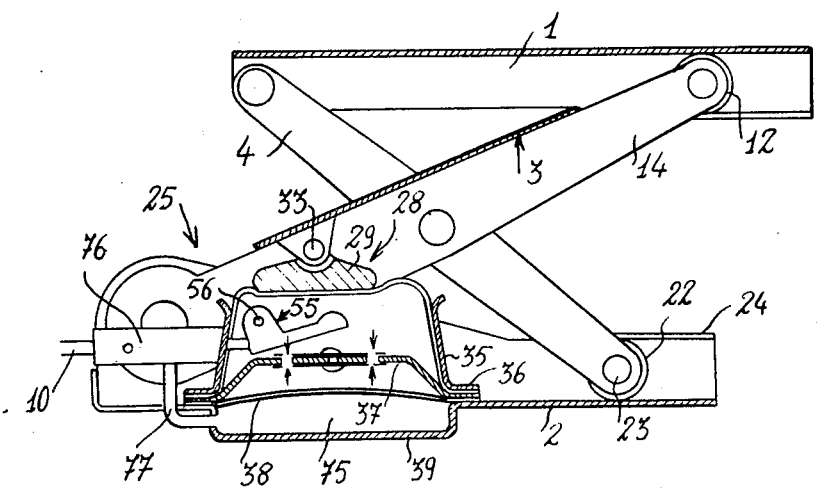

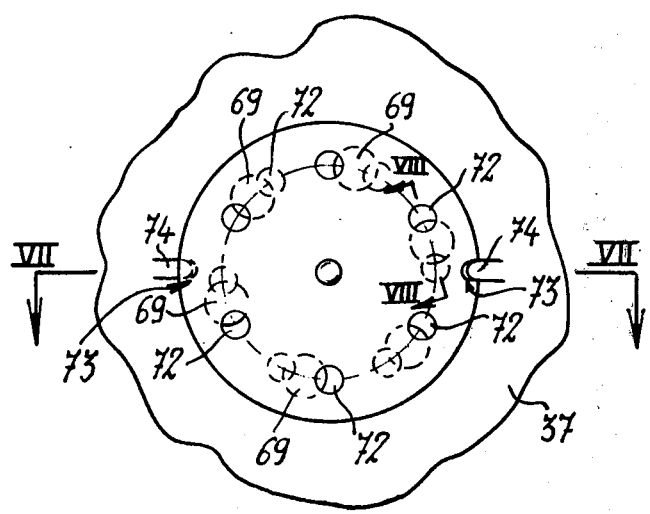
Fig: 6
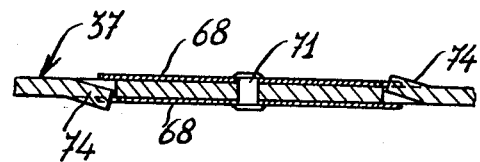
Fig: 7

SPRUNG SEAT FOR ALL VEHICLES

BACKGROUND OF THE INVENTION

1. Field of the Invention

The present invention relates to vehicle seats, notably wheel-mounted or crawler-track tractors, public works equipments and machines, or powdered military vehicles of all kinds, and more generally to any vehicle intended for travelling on uneven grounds or off the road and wherein the absence of a suspension system or the inefficiency of the existing suspension system does not provide a sufficient degree of comfort for the driver and/or the user.

2. Description of the Prior Art

Various types of seats intended for vehicles of the above-mentioned types and equipped with suspension systems providing an elastic return action and the damping of the seat oscillation in case of shocks and jolts in a vertical plane, are already known in the art. In a known construction, the seat is connected to a frame structure through linkage means constituting a parallel motion mechanism in which the lower links are rigidly coupled to a rubber ring capable of providing said elastic return action and damping the oscillation. This rubber ring is shear- and torsion stressed, and adapted to damp out both shocks and oscillation due to the inherent rubber hysteresis.

Another known construction comprises two pairs of pivoted arms disposed laterally between the squab-supporting cradle and the seat base, the ends of said arms being adapted to move along horizontal runways or guide-paths provided on said cradle and said base. The four arms or links are identical and form two "X", the upper arms being longer than the lower arms. The suspension member of this seat consists of a transverse torsion bar having one end adjustably anchored and the other end adapted to co-act with a link.

Experience teaches that these arrangements are not capable of fully damping out all shocks and oscillation, notably when the second construction is used, which is relatively complicated and expensive to manufacture. In this second device, moreover, the reaction force of the torsion bar constituting the elastic member is transmitted to only one side of the mechanism, thus causing a certain twist and consequently abnormal kinkings of the various metal components of the suspension system. As a result, more pronounced wear and tear of the pivot means are observed on one side of the seat compared with the opposite side.

In the vehicle seat disclosed in the French patent application No. 76.21065 these inconveniences are avoided by providing a suspension system comprising a central inclined main beam pivoted on the one hand to the base frame and on the other hand to the rear portion of an upper frame supporting the seat squab, said main beam co-acting with a pair of parallel lateral arms pivoted on the one hand to the rear portion of said base frame and on the other hand to the front portion of the seat squab frame. Each lateral arm is rigidly connected intermediate its ends to a transverse shaft trunnioned in said main beam.

Thus, the rigid main beam transmits the reaction torque to the elastic member and the latter tends to counteract the vertical movements of the seat squab frame. The assembly comprising the three beam and arms pivoted according to the above-described arrangement constitutes a rigid system whereby the seat squab frame can perform uniform vertical movements consistent with the suspension beat.

On the other hand, a set of rollers associated with the main beam and the lateral arms is adapted to keep the seat in a plane slightly inclined to the horizontal when the seat squab frame is shaken vertically.

This arrangement is particularly advantageous; yet it cannot eliminate completely parasitic mechanical friction contacts in the suspension system.

DESCRIPTION OF THE INVENTION

It is the primary object of the present invention to avoid the various inconveniences set forth hereinabove by providing a sprung seat wherein the pivotal mounting is somewhat similar to the one disclosed in the aforesaid French patent application but combines the advantageous features of this known structure with a suspension element free of any parasitic mechanical frictional contact.

The seat according to the present invention, intended more particularly for any wheel-mounted or crawler-track vehicle, such as a farming tractor or any public works equipments, comprises a sprung suspension mounted on a base frame and provided with elastic return means, this suspension comprising a central inclined main beam pivoted on the one hand to said base frame and on the other hand to the rear portion of a cradle or frame supporting the seat squab, said main beam being operatively connected to a pair of lateral arms having their ends pivotally connected to said base frame and to said seat squab cradle or frame, said lateral arms having furthermore their intermediate portions rigidly connected to a transverse shaft trunnioned in the main beam.

According to this invention, the seat suspension is characterized in that the elastic return means comprise a hydropneumatic device associated with an automatic monitoring distributor adapted to be connected to the pressure fluid circuit of the vehicle and capable of regulating the fluid pressure in the hydropneumatic device as a function of the seat squab cradle oscillation.

It is therefore clear that when the seat is jolted so as to cause the seat cradle to oscillate, no detrimental mechanical frictional contact take place in the hydropneumatic device associated with its monitoring distributor.

In a preferred form of embodiment the hydropneumatic device comprises a pneumatic chamber associated with a hydraulic actuator of which the piston is coupled to the main beam, the piston and actuator assembly being arranged beneath said main beam so as to bear or react against the base frame, the monitoring distributor communicating either with the hydraulic chamber of the actuator or with the pneumatic chamber associated therewith. The pneumatic chamber is disposed substantially level with the base frame and connected through the hydraulic actuator to the main beam of the pivoted seat structure. If the vehicle comprises a hydraulic circuit or system, the monitoring circuit is connected on the one hand to this distributor via a suitable pressure reducing device, and on the other hand to the chamber of the hydraulic actuator which contains fluid under pressure so as to regulate the fluid pressure as a function of the efforts transmitted by the piston and the main beam as a consequence of the seat oscillation.

In the case of a vehicle equipped with a pneumatic or compressed-air system or circuit, the distributor is connected on the one hand to this circuit and on the other hand to the pneumatic chamber in which it regulates the pressure as a function of the seat oscillation, the hydraulic fluid being enclosed permanently in the actuator chamber.

According to an essential feature characterizing this invention, the automatic monitoring distributor controlling the fluid pressure in the hydraulic actuator comprises a spool or slide valve movable as a consequence of the hydraulic pressure, together with means for automatically controlling the movement of the spool valve between a first position in which the liquid flows from said hydraulic actuator to the outlet of said distributor, while the seat squab cradle and the main beam actuates the piston of said actuator, and another position in which the liquid under pressure penetrates into the chamber of said hydraulic actuator while the distributor outlet is closed or shut off, thus raising the piston and the cradle.

Therefore the first position mentioned hereinabove corresponds to the discharge of hydraulic fluid from the chamber of the hydraulic actuator, at the beginning of an oscillation of said seat squab frame or cradle as the latter moves towards the base frame. The other position of the distributor spool valve is obtained when the cradle approaches the base frame sufficiently to cause a movement of said spool valve which involves the injection of fluid under pressure into said actuator chamber, the distributor outlet being shut off or closed in this case.

According to another feature characterizing this invention the actuator is provided with a hydraulic damper consisting preferably of a partition immersed in the liquid under pressure and having its outer periphery secured to the base of said actuator, said partition having orifices formed therethrough and associated with damping valves adapted to adjust the flow of liquid from one compartment to another compartment of said chamber.

The partition and its damping valves advantageously complete the hydropneumatic device and improve considerably the efficiency of the seat suspension.

Other features and advantages of this invention will appear as the following description proceeds with reference to the attached drawings.

BRIEF DESCRIPTION OF THE DRAWINGS

FIG. 1 is a section taken along the line I—I of FIG. 2, showing a first form of embodiment of the sprung seat according to this invention, the squab or cushion thereof being removed to simplify the drawing;

FIG. 2 is a front elevational view of the seat shown in FIG. 1;

FIG. 3 is a plane view from above of the same seat, the cradle or squab frame being removed for the sake of clarity;

FIG. 4 is a longitudinal section showing on a larger scale the automatic monitoring distributor of the hydraulic actuator equipping the seat of FIGS. 1 to 3, the spool valve of this distributor being shown in the first position mentioned hereinabove;

FIG. 5 is a sectional view similar to FIG. 4, showing the distributor spool valve in the second position aforesaid, in which the inner space of the actuator communicates with the hydraulic circuit of the vehicle;

FIG. 6 is a plane view from above showing on a larger scale, with parts broken away, the perforated partition and the valve means associated therewith, constituting the hydraulic damper of the hydropneumatic device illustrated in FIGS. 1 to 5;

FIG. 7 is a section taken along the line VII—VII of FIG. 6;

FIG. 8 is a fragmentary section along the line VIII—VIII of FIG. 6, showing on a larger scale the partial overlapping of the holes in the partition by the damping valve means, the lower valve being slightly unseated from the partition as a consequence of the force of the liquid flowing from the upper compartment of the actuator;

FIG. 9 is a section similar to FIG. 8 showing the position of the valve means when the liquid flows back from the lower compartment to the upper compartment through the perforated partition, during the upward stroke of the seat squab frame, and FIG. 10 is a sectional view similar to FIG. 1, showing another form of embodiment of the seat according to this invention.

DESCRIPTION OF THE PREFERRED EMBODIMENTS

Referring first to FIGS. 1 to 3 of the drawings, the seat according to this invention, intended more particularly for equipping off-the-road vehicles such as farming tractors, public works equipments, trucks, material handling equipments or machines, etc., comprises a frame 1 for a seat squab or cushion and the seat back (not shown) for the driver or any other occupant of the vehicle.

According to the above-mentioned French patent application, this seat comprises an elastic suspension system mounted on a base frame 2 and provided with resilient return means. This suspension system comprises a central inclined rigid main beam 2 pivoted to the base frame 3 at its front end and to the rear portion of said cradle or frame 1 at its rear end. Thus, in the example illustrated the rigid beam 3 is set at an angle of about 45° to the horizontal. In addition, this main beam 3 is adapted to co-act with a pair of lateral parallel arms 4 pivoted at one end to the rear portion of base frame 2 and at the opposite end to the front portion of the seat cradle or frame 1.

Each lateral arm 4 has its intermediate portion rigidly assembled with a transverse stub shaft 5 trunnioned in the main beam 3. For this purpose, this main beam 3 carries a pair of opposite cylindrical median sockets 6 having aligned bores engaged by the transverse stub shafts 5 supporting the lateral arms 4. Besides, the main beam 3 comprises at its front end a pair of bent lateral extensions 7 formed with circular apertures engaged by corresponding shouldered stub shafts 8 extending through a pair of upstanding vertical side flanges or plates 9 (assuming that the base frame 2 is horizontal) secured to the sides of base frame 2. Nuts 11 engaging said stub shafts 8 externally of said supporting flanges or plates 9 keep these stub shafts 8 in position.

The upper end portion of main beam 3 is provided with a pair of lateral rollers 12 adapted to roll on metal U-sectioned runways 13 secured to said cradle 1. These runways 13 are so positioned that one of the lateral wings of their cross section supports in rolling engagement the rollers 12 associated therewith, as shown in FIGS. 1 and 2.

The central portion of the main beam 3 consists of a plate having the aforesaid bent lateral extensions 7 formed on its front end, and a pair of rectilinear arms 14 at either ends of its rear portion, said arms 14 being rigidly connected in a manner known per se to a transverse shaft 15 carrying the pair of end rollers 12.

Nuts 16 engaging screw-threaded portions of stub shafts 6 are provided for rigidly assembling said stub shafts to the lateral arms 4.

The upper ends of lateral arms 4 adjacent the cradle 1 are each formed with an aperture receiving a corresponding pivot pin 17 extending through a ring 18, these elements being held in position by angle members 19 secured to the cradle 1 whereas the pivot pins 17 carry nuts 21 for securing the assembly to said angle members 19.

The lower end portions of lateral arms 4 are provided with rollers 22 similar to rollers 12. For this purpose, a transverse shaft 23 extends through the lower ends of arms 4 and carries a pair of rollers 22 at its ends. The runway 24 of rollers 22 are formed integrally with the metal base 2 and have U-shaped cross sections, the two wings of the U being disposed horizontally and receiving therebetween the corresponding roller 22 which is retained in the horizontal direction by the intermediate vertical portion of its U-section.

According to the instant invention, resilient means are provided for biasing the cradle 1 and the suspension system comprising the main rod 3 and lateral arms 4 to their initial position; said resilient means consist of a hydropneumatic device 25 associated with an automatic monitoring distributor 26 adapted to be connected via a pipe line 10 to the pressure-fluid circuit of the vehicle, said distributor 26 being adapted to regulate the pressure in the hydropneumatic device 25 as a function of the vertical oscillation of cradle 1.

The seat construction illustrated in FIGS. 1 to 5 of the drawings is intended for vehicles equipped with a hydraulic circuit, so that the distributor 26 can control automatically the hydraulic section of the hydropneumatic device 25. This device 25 comprises a pneumatic chamber 27 associated with a hydraulic actuator 28 provided with a piston 29 coupled to the main beam 3 under which the piston 29 of actuator 28 is located, this actuator 28 reacting against the base frame 2.

Therefore, the hydraulic actuator 28 lies above the pneumatic chamber 27 and beneath the main beam 3. Furthermore, the hydraulic chamber 31 of actuator 28 is bounded on the side of main beam 3 and laterally by a reinforced membrane 32 receiving the pressure of piston 29 on its top surface, as shown in FIGS. 1 and 10.

This piston 29 is of a relatively flat configuration so as to engage the reinforced membrane 32 with a large bearing surface area consistent with a suitable surface area:pressure ratio, and is pivotally mounted about a trunnion 33 rigid with a central support 34 of main beam 3. The reinforcing membrane 32 is a substantially bell-shaped member engaging with its upper portion the underface of piston 29 and having its base secured substantially level with the surface of base member 2. According to a specific feature characterizing this invention, the actuator 28 comprises a rigid annular casing 35 surrounding laterally the reinforced membrane 32 across the base member 2 to which said casing 35 is secured, for example by means of bolts, rivets or any other suitable fastening means (not shown) extending through or encircling an external peripheral flange 36 holding the casing 35 in position.

The base of the reinforced membrane 32 further comprises a peripheral external flange clamped between the flange 36 and the base frame 2 with the interposition of a partition 37 the function of which will be explained presently. Also inserted between this partition 37 and the base frame 2 is the peripheral outer flange of a flexible membrane 38 separating the pneumatic chamber (for example an air-filled chamber) 27 from the remaining inner volume of the reinforced membrane 32, filled with liquid under pressure, for example a suitable oil. In the embodiment illustrated the pneumatic chamber 27 is bounded on the side opposite said flexible membrane 38 by a bottom wall 39 obtained by pressing the metal base frame 2 or through any other suitable means, this bottom 39 having a substantially cylindrical shape.

The dimensions of said pneumatic chamber 27 are properly determined in order to obtain a chamber volume consistent with the maximum efficiency contemplated for the seat suspension.

The elastic membrane 38 consists for example of rubber and closes the pneumatic chamber 27 in a perfectly fluid-tight manner due to the clamping of its peripheral outer flange between the base frame 2 and the aforesaid partition 37, the latter being retained in turn by the rigid casing 35. The pneumatic chamber 27 is adapted to be pressurized by means of an inflation valve 41. Consequently, the flexible membrane 38 is acted on by pneumatic pressure on its bottom face and by a hydraulic pressure on its top face registering with the membrane 32, these pressures varying as a function of the weight of the occupant of the seat, for example the driver of the vehicle, and also according to the intensity of the vibration to which the seat is submitted.

The hydraulic chamber of actuator 28 comprising the rigid casing or metal barrel 35 of substantially frusto-conical configuration flaring downwardly and outwardly, and the bell-shaped membrane made for example of reinforced rubber, is capable of withstanding relatively high pressures. However, this actuator is flexible and secured in a fluid-tight manner to the base frame. As already explained in the foregoing, the upper portion of the reinforced membrane 32 engages the flattened cylindrical member 29 of which the bearing surface-area is determined as a function of the forces to be transmitted to said membrane 32 as a consequence of the vertical movements conducted by the main beam 3 of the suspension mechanism.

The chamber 31 thus formed is supplied with hydraulic fluid under pressure by the automatic monitoring distributor 26 to be described hereinafter with reference more particularly to FIGS. 4 and 5.

This distributor 26 comprises an elongated hollow body 42, of cylindrical shape in the example illustrated, having one end fitted in fluid-tight manner through the lateral wall of the rigid casing or metal barrel 35 and also through the lateral wall of the reinforced membrane 32. For this purpose, the end of said body 42 engaging the casing 35 comprises an inner tapped cavity for screwing a head 43 therein with the interposition of a tightening washer 44 engaging the wall of said membrane 32. This membrane 32, together with the rigid casing 35, engages annular grooves coaxial to said cylindrical body 42 in which they are retained by the head 43 and washer 44.

The end of cylindrical body 42 which is opposite said head 43 is likewise provided with a member 45 screwed in a cylindrical chamber 46 of body 42, said member 45 comprising a nipple or union 10 already mentioned in the foregoing for connecting the body 42 to the hydraulic circuit of the vehicle. An axial passage 47 connects this hydraulic circuit to chamber 46, the portion of member 45 bonding said chamber 46 comprising likewise a cylindrical cavity 48 of greater diameter than said passage 47.

According to a specific feature of the present invention, a movable spool valve 49 is mounted for fluid-tight sliding movement in a substantially cylindrical chamber 51 connecting the inlet chamber 46 to the hydraulic chamber 31, the head 43 having a suitable axial passage 52 formed therethrough for this purpose. Thus, the inner space of body 42 communicates via a central aperture 53 of head 43 with the hydraulic chamber 31 and further comprises a lateral outlet 54 opening substantially into the central portion of the bore 52 receiving said spool valve 49, so that the liquid under pressure can be discharged from the hydraulic cylinder 28 to the outside.

According to an essential feature characterizing this invention, the automatic monitoring distributor 26 comprises means for controlling automatically the movement of spool valve 49 between a first position in which the liquid from cylinder 28 flows from chamber 31 to the outlet port 54 of the distributor, while the cradle 1 is moving downwards, and the main beam 3 pushes the piston 29 against the reinforced membrane 32, the supply of liquid under pressure to this distributor 26 being cut off. Complementarily, said means may bring the spool valve 49 to another position in which liquid under pressure penetrates into the hydraulic chamber 31 while the outlet 54 is closed or shut off. This second position corresponds to the injection of hydraulic fluid into the actuator 28 for inflating the membrane 32 and therefore lifting the seat frame 1, and is illustrated in FIG. 5; FIG. 4 illustrates the spool valve in the first above-defined position in which the hydraulic liquid is expelled by the pressure exerted through piston 29 from within the actuator 28 to the outside via outlet 54 of distributor 26. In the exemplary form of embodiment illustrated in the drawings the above-defined automatic means controlling the position of spool valve 49 comprise a bell-crank lever 55 visible in FIG. 1 and mounted within the hydraulic chamber 31 in a manner permitting of releasing the sliding movement of spool valve 49 towards the input union or nipple 10 of distributor 26 as a consequence of the thrust exerted by the membrane 26 receiving the pressure of piston 29 when the seat frame 1 is lowered. Thus, said bell-crank lever 5 is fulcrumed about a pivot pin 56 secured across the metal casing 35 above the level of the movable spool 49. The pivot pin 56 of this bell-crank lever 55 extends through an end portion 55a of lever 55 which is located in close vicinity of spool valve 49 and somewhat at the same level as this valve, said portion 55a having a perpendicular extension in the form of an elongated portion 55b having its end rounded at the top so as to register with the lower face of said reinforced membrane 32. Since the upper end of the elongated portion 55b is rounded, any risk of damaging the reinforced rubber membrane 32 when the latter is urged against said rounded portion of bell-crank lever 55 as a consequence of the thrust exerted by piston 29 is safely precluded.

The end portion 55a adjacent said spool valve 49 engages a rounded end portion 49a of said spool valve 49 which constitutes a finger projecting through the head 43 into the hydraulic chamber 31. In the form of embodiment illustrated in detail in FIGS. 4 and 5, this finger 49a is separated from the main spool valve body 49 and comprises an enlarged base portion 56 adapted to engage a corresponding shoulder 57 formed in the head 43 for limiting the penetration of said finger 49a into the hydraulic actuator 28. It is clear that when the membrane 32 is lowered as a consequence of a jolt, thus causing the piston 29 to depress said membrane 32, the latter engages the rounded end portion of bell-crank lever 55, thus causing the latter to push the spool-valve extension 49a inwardly. Therefore, the spool valve 49 proper is pushed by the finger 49a in its bore 52 towards the inlet union or nipple 10 as a consequence of the pivotal movement of bell-crank lever 55. Conversely, a movement of spool valve 49 and of its finger 49a in the opposite direction will cause the bell-crank lever 55 to pivot about its pivot pin 56 in such a way that the rounded end portion of its longer arm 55b will push the membrane 32 upwards. Thus, the lever 55 can be caused to pivot back to its initial position by the pressure exerted thereon by the end finger 49a of spool 49.

According to another feature characterizing this invention, the spool valve 49 comprises an axial longitudinal passage 58 coaxial with the cylindrical body 42. One end of this passage 58 communicates with the interior of hydraulic chamber 31 via an intermediate passage or clearance formed between said finger 49a and the head 43, as clearly shown in FIGS. 4 and 5. The opposite end of passage 58 registers with a valve member 59 constantly biased to its closed position by resilient return means consisting in this example of a coil compression spring 61. This spring 61 reacts against a ball valve 62 disposed in the bottom of chamber 48 and adapted to co-act with the seat formed by the registering end of passage 47 when the hydraulic pressure in this passage is not sufficient for unseating the ball valve 62.

The return spring 61 engages a central projection 63 of valve member 59. Thus, the latter is normally urged by said spring 61 to its seated position with respect to an annular shoulder 64 limiting the cylindrical chamber 46 of spool valve 49.

According to another feature characterizing this invention, the spool valve 49 comprises an O-ring 65 disposed between the outlet 54 of the distributor and valve member 59 in order to permit a fluid-tight sliding engagement between the bore of distributor body 42 and spool valve 49. The latter further comprises a ring 66 disposed coaxially to the central passage 58 between the outlet 54 of distributor 26 and the passage 53 thereof communicating with actuator 28. This ring 66 is secured to the spool valve 49 and can thus follow the axial movements thereof between a pair of abutment members consisting the one by the registering end of the screw-threaded head 43 and the other by an annular shoulder 67 formed in the body 42. Thus, when the seat cradle 1 is lowered as a consequence of a jolt, the membrane 32 urged by piston 29 causes the lever 55 to pivot so that its portion 55a pushes the spool valve 49 against valve member 59 and the opposite force of spring 61. This position is illustrated in FIG. 5 showing the valve member unseated. The actuator 28 further comprises a hydraulic damper consisting of the aforesaid partition 37 in the form of embodiment illustrated and also of associated damping valve members 68 of which two are shown by way of example (see FIGS. 1 and 6 to 9).

The partition 37 is a substantially dished and inverted pressed metal part (i.e. with its bottom higher than its edge) immersed in the liquid under pressure contained in chamber 31. The outer peripheral flange of this dished and inverted partition 31 is secured to the pneumatic chamber 27 and to the base of actuator 28; the partition 37 has a plurality of holes 69 (see FIGS. 6 to 9) formed through its bottom along a circular line concentric to the actuator and partition assembly. These holes 69 are thus disposed at spaced intervals and associated with a pair of flexible valve members 68 adapted to control the flow of liquid from one compartment to the other of chamber 31.

These valve members 68 consist each of a circular metal disc secured to the center of the bottom of the partition 37 through any suitable fastening means such as a rivet 71. Each valve member 68 has formed therethrough a series or circular holes 72 corresponding to the holes 69 of partition 37 but of smaller diameter. The valve members 68 are secured to said partition 37 on either side thereof so that the orifices 72 of each valve member 68 overlap only partially the holes 69, as clearly shown in FIGS. 6, 8 and 9, means being also provided for preventing the valve members 68 from pivoting in relation to partition 37 once the angular position of their orifices 72 has been properly set in relation to that of holes 69 of partition 37.

In the above-described form of embodiment the means contemplated for preventing the valve members 68 from pivoting in relation to partition 37 consist of a pair of peripheral notches 73 formed during the punching operation required for the manufacture of said valve members 68. These notches 73 are each engaged by a lug 74 projecting from partition 37. These stop lugs 74 may be formed for instance by punching; they are located in opposition on a common diameter and slightly inclined to the plane of valve members 68 for engagement into the registering notches 73, as shown in FIGS. 6 and 7. The position of lugs 74 and the position of the corresponding receiving notches 73 is determined accurately in relation to the regularly spaced holes 69 and orifices 72, to permit a proper gauging of the passage available for the liquid of actuator 28 and ensure a reliable operation of the damper.

As shown in FIGS. 8 and 9, the upper valve member 68 is pressed against the partition 37 when the liquid flows therethrough towards the flexible membrane 38 of pneumatic chamber 27, this direction of flow being illustrated diagrammatically by the arrow F. On the other hand, the lower valve member 68 is slightly unseated from partition 37 as a consequence of the hydraulic pressure exerted on said lower valve member, the liquid flowing through the partition 37 and one portion of the cross-sectional area of apertures 72 and the whole of the cross-sectional area of holes 69 of partition 37.

Conversely, when the liquid flows through partition 37 in the opposite direction, i.e. upwards in the direction of the reinforced membrane 32 as when the seat cradle or frame 1 is lifted as a consequence of a jolt, the liquid under pressure presses the lower valve member 6, and then flows through the orifices 72 and holes 69 as shown by the arrow G in FIG. 9.

During the operation of this hydraulic damper the notches 73 and lugs 74 associated therewith prevent any rotation of valve members 68 about their common axis and therefore any misadjustment of the damper after the initial adjustment of the positions of orifices 72 in relation to holes 69.

The above-described sprung seat and more particularly the hydropneumatic device 25 associated therewith operate as follows:

The pneumatic chamber 27 is firstly inflated to a suitable pressure by means of a valve 41, this pressure varying as a function of the weight of the occupant of the seat and also of the intensity of the vibration likely to be applied to the seat. Then the inlet union or nipple 10 of distributor 26 is adequately connected to the hydraulic circuit of the vehicle, the inner space of distributor 26 communicating with the hydraulic chamber of actuator 28 and being filled with liquid under pressure such as oil.

When jolts are applied to the seat, the seat cradle 1 is lowered and causes the main beam 3 and lateral arms 4 to pivot towards the base frame 2, so that piston 29 pushes the reinforced membrane 32 towards the monitoring lever 55. When the upper rounded portion of the elongated portion 55b of this lever is moved by the membrane 32, the lever 55 rotates about its pivot pin 56 and its end portion 55a pushes the finger 49a of spool valve 49 towards valve member 59. This movement of spool valve 49 is shown by the arrow K of the FIG. 5.

At the same time, liquid under pressure is forced into the hydraulic chamber through the partition 37, as illustrated in FIG. 8, so that the flexible rubber membrane 38 is tensioned towards the bottom 39 of the pneumatic chamber 27.

The spool valve 49 unseats the valve member 59 whereby the liquid under pressure can flow from chamber 46 into the longitudinal passage 58 of spool valve 49 after having slightly unseated the ball valve 62 to open the inlet passage 47. On the other hand, the O-ring 65 prevents the liquid from over-stepping its level and therefore from flowing through the outlet 54 of distributor 26. Simultaneously, the ring 66 is moved to a position of fluid-tight engagement with its seat 67, so that the liquid cannot flow from this side to the outlet 54. As a result, the liquid flowing from the hydraulic circuit of the vehicle is injected into the hydraulic chamber 31 via the longitudinal passage 58 and the clearance left between finger 49a and head 43 of distributor 26. The path thus followed by the liquid is shown by the arrows in FIG. 5. Consequently, the hydraulic pressure in actuator 28 increases, the reinforced membrane 32 is pressed against piston 29 and spreads out while pushing this piston upwards. The beam 3 and arms 4 are thus lifted and carry along the seat frame 1 which gradually resumes its initial position. When the membrane 32 moves away from the rounded end of lever 55, the latter's pressure against spool valve 49, which is transmitted to valve member 59, is discontinued, so that this valve member 59 urged by its return spring 61 resumes its fluid-tight engagement with its seat 64. This condition is illustrated in FIG. 4, the ball valve 62 shutting off again the fluid injection passage 47. Liquid under pressure is thus trapped in chamber 46 and cannot flow along spool valve 49 so that the latter subsequently moves slightly away from valve member 59 (see arrow L in FIG. 4) and the liquid under pressure from hydraulic chamber 31 can flow past the now unseated ring 66. The liquid is thus discharged to and through the outlet 54 along the path shown by the arrows in FIG. 4. Therefore, the hydraulic pressure decreases in actuator 28 and this pressure decrement is damped by the partition 37 and its damping valve members 68 through which the liquid flows upwards as illustrated in FIG. 9.

During each jolt applied to the seat the distributor 26 co-acting with the pivoting lever 55 associated with spool valve 49 and valve member 59 exerts an automatic monitoring or regulating action on the hydraulic pressure in actuator 28. This regulation ensures a constant balancing of the seat level and also of the hydraulic pressure within actuator 28 as a function of the weight of the driver or other occupant of the seat.

The function of hydraulic chamber 31 is to provide a constant, optimum adjustment level irrespective of the load applied to the seat, and also to modulate the hydraulic pressure as a function of the seat movements when the vehicle is in motion.

On the other hand, the liquid under pressure has the following functions: On the one hand, it provides a fluid connection between piston 29 and the pneumatic chamber 27 imparting the desired elasticity of the seat suspension system, so that it will absorb shocks and jolts without any parasitic mechanical frictional contact, only by virtue of the changes produced in the shape of the reinforced membrane 32.

On the other hand, the liquid under pressure damps out and retards the movements of the seat suspension system by reducing its output through the gauged orifices 69 and 72 of partition 37 and of damping valve members 68.

A dual function is devolved to this partition 37. Firstly, it permits of limiting the beat or movements of the flexible membrane 38 of pneumatic chamber 27 and therefore the volume of this chamber. Secondly, it permits the flow of liquid to one or the other side of this membrane and also of valve members 68 in order to compress the gas contained in pneumatic chamber 27, thus imparting the necessary elasticity to the suspension system when the piston 29 of actuator 28 is depressed. As a complement thereto, the partition 37 is capable of exerting a force in the opposite direction on this actuator 28, thus causing the upward movement of piston 29 and therefore of the suspension system, since the liquid can flow in the opposite direction, that is, upwardly as illustrated in FIG. 9. The liquid movement takes place through partition 37 as mentioned in the foregoing, the orifices 72 being more or less closed according to whether the liquid flows in one or the other direction, the flexible valve-forming washers 68 being of the unidirectional-flow type.

Therefore, the hydropneumatic device according to this invention for automatically monitoring the hydraulic pressure in the seat suspension system is particularly advantageous, notably on account of the elimination of any parasitic mechanical frictional contact, as already explained in the foregoing.

In the inoperative condition, that is, when no jolts are exerted on the seat and the driver or other occupant is seated thereon, the hydropneumatic device 25 is in the following condition: lever 55 engages spool valve 49 so that the latter will slightly unseat valve 59 from its seat 64, while ring 66 is not pressed in a fluid-tight manner against seat 67. Therefore, a small amount of liquid under pressure flows into the hydraulic chamber 31 and causes the pressure therein to increase, thus compressing the flexible membrane 38 until a state of equilibrium is obtained between the reaction produced by this membrane and the hydraulic pressure which varies and adapts itself as a function of the weight of the driver or drivers. The squab frame 1 is thus maintained at a constant level and a continuous circulation of liquid is maintained between distributor 26 and the outlet 54 thereof.

The seat according to this invention is also characterized by the following advantageous features. It can be mounted indifferently on mechanical systems having a structure other than that of the system illustrated in the drawings, for example a structure of the parallelogram or scissor type, and in any position in relation thereto. The monitoring system is an internal one, that is, incorporated in the liquid-containing chamber 31, at least as far as the monitoring lever 55 and the projecting portion associated with spool valve 49 are concerned. With this arrangement, any undesired and untimely liquid leakage to the outside is safely prevented.

Similarly, the permissible movements of control lever 55 are limited and will cut off tightly any supply of fresh oil whatever its pressure may be, thus eliminating any risk of bursting the reinforced membrane while maintaining the seat at a constant level, irrespective of the driver's weight. In fact, this lever 55 is not rigidly coupled or responsive to the vertical stroke or movement of cradle 1, and becomes operative only during one fraction of this stroke, this lever being uncoupled from the seat movements immediately when the seat level, that is, the level of its squab frame or cradle 1, exceeds a predetermined value. In this position, the liquid-filled chamber 31 is under pressure-release condition and communicates with the return circuit. By way of indication, the input pressure necessary for properly operating the device is about 15 bars.

In case the pressure fluid delivered by the hydraulic circuit of the vehicle exceeded this or another rated value, a regulator consisting of a hydraulic pressure-reducing device of a type known per se is fitted upstream of the monitoring distributor 26. Thus, an accurate regulation at 15 bars can be obtained from relatively high pressure values (of the order of 200 bars or more).

The double-acting hydraulic damper arranged in the liquidfilled chamber of actuator 28 is particularly reliable and can be set to provide the maximum efficiency according to the utilizations contemplated for the seat, when fitting the latter to the vehicle. This setting is accomplished without any modifications of the component elements, by simply rotating the concentric valve members 68 so as to uncover more or less the peripheral orifices 72. The thus preset assembly preserves its initial adjustment with a great stability in time, since the component elements of this system are not liable to wear and tear and operate in a nearly static manner.

On the other hand, the upper and lower valves 68 are mounted with their orifices directed diagonally in relation to the holes 69 of partition 37, so that the oil flowing therethrough will promote the proper operation of valves 68 and provide a regular and constant damping action. In the control distributor 26 the ball valve 62 associated with valve member 59 constitutes a non-return valve system incorporated in the monitoring system, thus avoiding any momentary loss of pressure in the seat suspension when considerable amounts of fluid under pressure are drawn from the hydraulic circuit of the vehicle for operating power apparatus such as jacks, sundry actuators, etc.

In the modified embodiment illustrated in FIG. 10 the seat differs from the preceding construction in that the hydropneumatic device is adapted to be connected to a source of pneumatic fluid instead of a hydraulic source. In this arrangement, the actuator 28 does not comprise any hydraulic monitoring system but is filled permanently with oil or other suitable fluid in order on the one hand to provide the fluid connection between the actuator 28 and the pneumatic chamber 75 and on the other hand to perform like the hydraulic damper, the latter being constructed substantially like the one illustrated in FIGS. 1 to 9.

However, the pressure modulation is obtained in pneumatic chamber 75 by means of a pneumatic regulation device 76 of the pressure-reducing type. This distributor is connected via a pipe 77 to the inner space of pneumatic chamber 75, so that the inflation valve of the preceding form of embodiment can be dispensed with in this modified construction. The pneumatic monitoring distributor 76 operates somewhat like the hydraulic distributor 26 and incorporates the pneumatic chamber 75 into the pneumatic circuit of the vehicle. Therefore, this version is suitable for a vehicle equipped with a pneumatic circuit system and operates with the same efficiency as the hydraulically monitored seat.

Of course, this invention should not be construed as being strictly limited to the forms of embodiment described, illustrated or suggested herein, since various modifications may be brought thereto without departing from the basic principles of the invention as set forth in the appended claims. Thus, the fluid connections between piston 29 of actuator 28 and the regulation distributor 26 or 76 may be provided through any suitable component elements or means other than the bellcrank lever 55 but performing the same functions. Similarly, the hydraulic damper of actuator 28 may be arranged in a manner differring from the arrangement illustrated.

The seat according to this invention may also be utilized on vehicles not equipped with hydraulic or pneumatic circuit means. In this case the seat suspension comprises neither a pneumatic monitoring system nor a hydraulic monitoring system, and the liquid-receiving chamber is filled permanently with hydraulic liquid when fitting the seat on the vehicle, the pneumatic chamber being inflated at a pressure consistent with the driver's weight, a suitable inflation valve being provided for this purpose. In this modified construction, the suspension system does not comprise any device for ensuring an automatic regulation in actual service, the only requirement to be met being the fixed adjustment or setting of the pressure before use, by adapting this regulation to each driver or occupant. Of course, this last-mentioned structure is considerably more economical and operates very satisfactorily, notwithstanding its reduced cost.

The seat according to the invention may be fitted to all types of wheel-mounted or crawler-track vehicles.

What is claimed as new is:

1. A seat, notably for wheel-mounted or crawler-track off-the-road vehicles such as farming tractors, public works equipments and military vehicles, which comprises an elastic suspension system mounted on a base frame and supporting a seat squab frame, with elastic return means, wherein said elastic return means comprises a hydropneumatic device associated with an automatic monitoring distributor integrated within said device, adapted to be coupled to the pressure-fluid circuit of the vehicle, and to automatically regulate the pressure in the hydropneumatic device in harmony with the oscillation of said seat squab frame, independently of driver's weight.

2. A seat, notably for wheel-mounted or crawler-track off-the-road vehicles such as farming tractors, public works equipments and military vehicles, which comprises an elastic suspension system mounted on a base frame, supporting a seat squab frame and including a main beam, with elastic return means, wherein said elastic return means comprises a hydropneumatic device associated with an automatic monitoring distributor integrated within said device, adapted to be coupled to the pressure-fluid circuit of the vehicle and to regulate the pressure in the hydropneumatic device in harmony with the oscillation of said seat squab frame, independently of driver's weight and including a pneumatic chamber associated with a hydraulic actuator comprising a piston, and wherein the base frame is disposed horizontally with said hydraulic actuator overlying said pneumatic chamber and beneath said main beam, the hydraulic chamber of said actuator being bounded on the side of said main beam and laterally by a reinforced membrane adapted to be engaged by said piston.

3. A seat as recited in claim 2, wherein said piston consists of a relatively flat member pivotally mounted to said main beam.

4. A seat as recited in claim 3, wherein said pneumatic chamber is separated from said hydraulic actuator by a flexible deformable membrane, means being provided for fastening in a fluid-tight manner the outer periphery of said flexible membrane to the outer periphery of the hydraulic chamber of said actuator.

5. A seat as recited in claim 4, wherein said hydraulic actuator comprises a rigid annular casing surrounding laterally said reinforced membrane secured transversely to the base of said casing, said automatic monitoring distributor being supported by said casing.

6. A seat as recited in claim 5, wherein said distributor comprises a hollow elongated body having one end fitted in a fluid-tight manner in said rigid casing and a movable spool valve responsive to the hydraulic pressure which is slidably mounted in a bore of said distributor body, said distributor body comprising an inlet permitting the coupling thereof to the hydraulic circuit of the vehicle, an aperture communicating with the inner space of said hydraulic actuator chamber, and an outlet orifice for the liquid under pressure.

7. A seat as recited in claim 6, wherein said distributor further comprises means for automatically controlling the movements of said spool valve from a first position in which the liquid can flow from the interior of said actuator to said distributor outlet during the downward movements of said seat squab frame and the movement of said piston pushed by said main beam against said reinforced membrane, while the supply of liquid to said distributor is cut off, to another position in which the liquid under pressure is allowed to flow into said hydraulic actuator chamber while said outlet is shut off, in order to cause the upward movement of the deformable portion of said reinforced membrane, said piston and said seat squab frame.

8. A seat as recited in claim 7, wherein said means for automatically controlling said spool valve comprise a bell-crank lever adapted to release said spool valve, said lever being pivotally mounted within said actuator chamber for pivoting in one direction when said reinforced membrane is depressed by said piston and consequently by said seat squab frame and pushes said lever as a consequence of the piston movement, said lever being thus adapted to push in turn said spool valve towards the distributor inlet by engaging an end portion of said spool valve which projects into the actuator chamber, said lever being adapted to be restored by pivoting in the opposite direction to its initial position through the movement of said projecting end portion of said spool after the supply of fluid to said actuator has been turned off.

9. A seat as recited in claim 7, wherein said spool valve comprises a central passage having one end connected to the interior of said actuator chamber while the opposite end opens in front of a valve member associated with resilient return means adapted to urge said valve member to a position in which said valve member shuts off the supply of liquid to the actuator while liquid flows through the distributor outlet and said spool valve is in its first position corresponding to the discharge of fluid from said distributor under the control of said valve member.

10. A seat as recited in claim 8, wherein said spool valve comprises a central passage having one end connected to the interior of said actuator chamber while the opposite end opens in front of a valve member associated with resilient return means adapted to urge said valve member to a position in which said valve member shuts off the supply of liquid to the actuator while liquid flows through the distributor outlet and said spool valve is in its first position corresponding to the discharge of fluid from distributor under the control of said valve member.

11. A seat as recited in claim 10, wherein said spool valve is associated on the one hand with an annular seal disposed between said distributor outlet and the valve member controlling the distributor inlet in order to seal said body in relation to said spool valve, and on the other hand with a ring coaxial to said central passage and disposed between the distributor outlet and its aperture communicating with said actuator, said ring being adapted to abut in a fluid-tight manner an annular shoulder formed in said body when said spool valve is pushed by said monitoring lever towards the distributor inlet when said seat squab frame is lowered.

12. A seat as recited in claim 11, wherein said actuator is provided with hydraulic damping means.

13. A seat as recited in claim 12, wherein said hydraulic damping means comprise a partition immersed in the liquid under pressure and having its outer periphery secured to said pneumatic chamber and to the base of said actuator, said partition having preferably the shape of an inverted dish and being provided with holes associated with damping valve members permitting the adjustment of the liquid flow from one compartment to another of said chamber.

14. A seat is recited in claim 12, wherein said partition comprises a set of through holes disposed at spaced intervals along a circle centered to the partition, and a pair of valve members also comprising two corresponding sets of orifices and secured on either side of said partition so that the orifices of each valve member partially overlap the holes of said partition, means being also provided for preventing said valve members from pivoting in relation to said partition once the angular position of said orifices has been properly adjusted with respect to the holes of said partition.

15. A seat as recited in claim 2, intended more particularly for vehicles equipped with a pneumatic circuit, which comprises an automatic regulation device connected on the one hand to said pneumatic chamber and on the other hand to said pressure-fluid circuit of the vehicle with the interposition of a pressure reducing device, said actuator being filled permanently with liquid under pressure and interconnecting said pneumatic chamber and said seat squab frame.

16. A seat as recited in claim 11, intended more particularly for vehicles equipped with a pneumatic circuit, which comprises an automatic regulation device connected on the one hand to said pneumatic chamber and on the other hand to said pneumatic circuit of the vehicle with the interposition of a pressure reducing device, said actuator being filled permanently with liquid under pressure and interconnecting said pneumatic chamber and said seat squab frame.

17. A seat as recited in claim 12, intended more particularly for vehicles equipped with a pneumatic circuit, which comprises an automatic regulation device connected on the one hand to said pneumatic chamber and on the other hand to said pneumatic circuit of the vehicle with the interposition of a pressure reducing device, said actuator being filled permanently with liquid under pressure and interconnecting said pneumatic chamber and said seat squab frame.

18. A seat as recited in claim 13, intended more particularly for vehicles equipped with a pneumatic circuit, which comprises an automatic regulation device connected on the one hand to said pneumatic chamber and on the other hand to said pneumatic circuit of the vehicle with the interposition of a pressure reducing device, said actuator being filled permanently with liquid under pressure and interconnecting said pneumatic chamber and said seat squab frame.

* * * * *